Feb. 28, 1956  E. G. DUERINGER ET AL  2,736,461
METHOD OF UNLOADING STORAGE STRUCTURES
Filed June 11, 1952  2 Sheets-Sheet 1

INVENTORS:
Erwin G. Dueringer
BY Wesley G. Martin

Andrus & Sceales
ATTORNEYS.

Feb. 28, 1956   E. G. DUERINGER ET AL   2,736,461
METHOD OF UNLOADING STORAGE STRUCTURES
Filed June 11, 1952
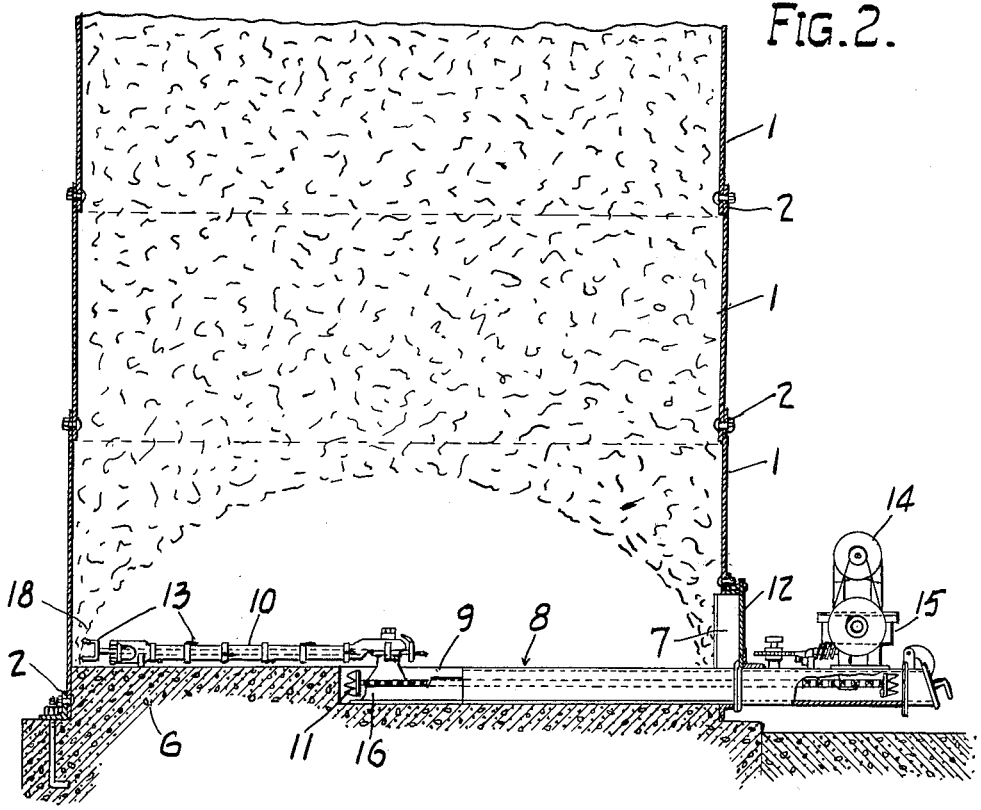
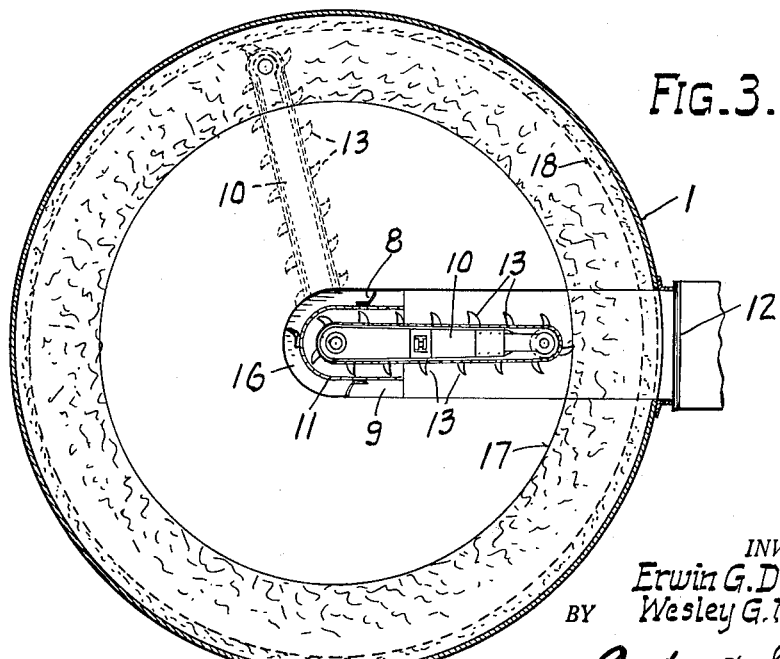
INVENTORS:
Erwin G. Dueringer
Wesley G. Martin
BY Andrus & Sceales
ATTORNEYS.

United States Patent Office 2,736,461
Patented Feb. 28, 1956

2,736,461

METHOD OF UNLOADING STORAGE STRUCTURES

Erwin G. Dueringer and Wesley G. Martin, Milwaukee, Wis., assignors to A. O. Smith Corporation, Milwaukee, Wis., a corporation of New York Application June 11, 1952, Serial No. 293,014

7 Claims. (Cl. 222—1)

This invention relates generally to unloading material which is stored in a storage structure, and particularly to a method for unloading material from the bottom of a storage structure such as for instance, a cylindrical silo which has disposed in the bottom thereof mechanical means for unloading the stored material. The invention is particularly well adapted to unloading silage crops which have a tendency to become packed at the bottom of the silo due to the weight of the column of silage.

One form of mechanical means for unloading the silage comprises in general, a cutter arm and a conveyor. The cutter arm is disposed above the conveyor and rotates around the bottom of the silo while a plurality of cutter teeth, disposed on the arm, move longitudinally of the arm, cut into and move the silage to the inner end of a trough disposed in the bottom of the silo, where the conveyor moves the cut silage longitudinally along the trough to an opening disposed in the wall of the silo.

In a modern type of silo which may be of any particular diameter desired but, which generally varies from fourteen feet to seventeen or eighteen feet, and forty or more feet in height, the weight of the silage stored therein is very substantial. The silage at the bottom of the silo becomes of maximum density because of the weight of the column of silage. Tests have disclosed that once this compacting tendency of the stored material in the bottom of the silo has begun, it becomes progressively worse making it extremely difficult for the silage to flow downwardly properly so that the unloader mechanism may cut the same and deliver the cut silage to the outside.

Tests and observations have also proven that unloading silage from the bottom of a silo equipped with a bottom unloader is easier if the silage arches closely adjacent and above the bottom unloader. The reason for this appears to be that the narrow width of a circumferential ring of silage, disposed between the outer end of the cutter arm and the base of the silo wall, is incapable of holding the mass of silage in a static condition and therefore the silage will tend to flow downwardly so that the unloader may efficiently perform its function.

Substantially all types of silage has a tendency to compact at the bottom of the silo and this is particularly true of grass silage wherein the grass has been cut into pieces of substantially short lengths and then blown into the silo.

The short lengths of grass generally fall and come to rest in a plurality of horizontally disposed layers in which the particles of grass are intertwined into a maze of crisscross layers. This may be more or less true of other types of silage also. The problem which this invention solves therefore, is the establishing of planned arches at the bottom of the column of stored material at the beginning of the unloading operation, to the end that the silage will continue to feed downwardly toward the unloading mechanism at a substantially even rate of flow—in other words the flow of silage will not be held back by a ring of silage of substantial width disposed between the end of the cutter arm and the bottom of the silo wall.

The primary object of the invention is to provide a method for the positive formation and control of planned arches at the bottom of a column of silage in a storage structure which has an unloading mechanism disposed in the bottom thereof.

A further object is to provide a method to cause the formation of planned arches at the bottom of a column of silage disposed within a storage structure, whereby the column of stored silage will move downwardly within the silo at a substantially uniform rate, so that a mechanical unloader mechanism disposed at the bottom of the silo and beneath the column of silage may operate efficiently to deliver the silage to the outside of the silo.

Another object of the invention is to provide a method for initially removing a portion of the bottom layers of silage stored within a storage structure, and subsequently radially removing a further portion of the remaining bottom layers of silage stored in a silage structure to shape the bottom of the silage column so that the remaining silage will flow downwardly at a substantially uniform rate, and so that the same may be delivered from the interior of the storage structure to the outside thereof.

Another object of the invention is to provide a method for unloading silage from the interior of a storage structure by utilizing a bottom unloader mechanism to form a plurality of arches upwardly within the bottom layers of the stored material, the bases of the progressively formed arches increasing in diameter until the base of the last arch which is formed extends to within a predetermined distance equally from the bottom inner wall of the storage structure.

Another object of the invention is to provide a method whereby a plurality of arches or concavities are progressively formed upwardly in the bottom layers of material stored within a storage structure which is equipped with a bottom unloader mechanism so that the cross-sectional area of the base of the arches progressively reduces to a predetermined figure so that the stored material will not be held in a static condition but will be permitted to move downwardly to the unloader.

These and other objects of the invention will appear from the following description of the invention when read in conjunction with the drawing in which:

Fig. 2 is a view similar to Figure 1 but showing the final step of the method of the invention; and Fig. 3 is a schematic transverse sectional view, with parts broken away, showing the relative cross-sectional areas of the bases of the silage arches of the initial step and the final step (dotted) of the method of the invention.

Figure 1:
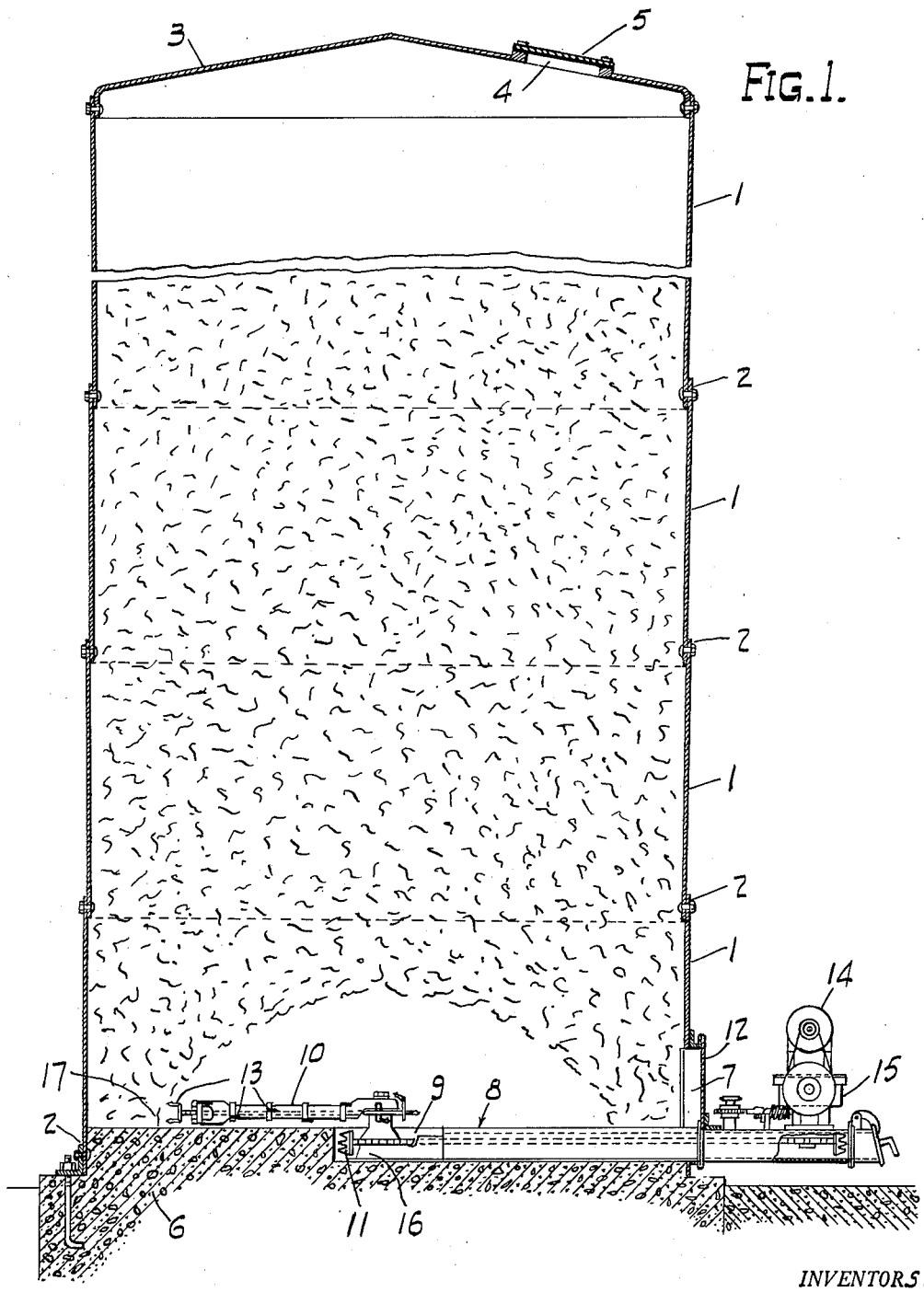
Figure 1 is a vertical sectional view of a storage structure, with parts broken away, which is equipped with an unloader mechanism, and showing the initial step of the method of the invention.

The invention in general comprises a method of removing stored material from the bottom of a storage structure such as a silo, in which the lower layers of the stored material are subjected to a plurality of cutting and conveying steps, so that upwardly extending arches or concavities are formed in the material with the distance across the base of the arch progressively increasing during subsequent steps of the method. The invention also comprises a method of removing stored material from the bottom of a storage structure by utilizing a bottom unloader mechanism in a particular sequence of steps so that as the cross-sectional area of the bases of the formed arches decrease the pressure builds up on the base of the final arch of material, that is, on the circumferential ring of stored material which is disposed between the outer end of the rotating cutter arm and the lower inner surface of the silo wall, to the end that the remaining mass of stored material will flow or pass downwardly in such a manner that the unloader mechanism will be able to perform its function more efficiently.

The invention is described in connection with a cylindrical storage structure such as a silo which comprises a plurality of cylindrical sections 1 formed from steel and preferably having a coating or lining of ceramic enamel (not shown) fused to both surfaces of the sections. The cylindrical sections are joined together at joints 2 which preferably are provided with a moisture-proof and air-proof cement at the joints to keep out air and moisture. The silo is provided with a top 3 having an opening 4 extending therethrough so that forage crops may be loaded into the silo. The opening is provided with an airtight cover 5 which is kept in place when the silo is not being filled. The silo is secured to a foundation 6 preferably of cement which provides a floor for the structure. The lowermost cylindrical section of the silo is provided with an opening 7 in the wall thereof for the insertion and withdrawal of an unloader 8 into a trough 9 which extends from the wall of the silo to substantially the center of the foundation.

The unloader comprises a cutter arm 10 disposed above an endless conveyor 11, the latter being disposed in the trough 9 and extending outwardly beyond the wall of the structure so that the stored material may be conveyed to the outside through an air-tight door 12.

The cutter-arm is disposed above the floor of the foundation and is adapted to rotate therearound, the arm being provided with a plurality of cutters 13 which travel longitudinally along the cutter arm as it is rotating.

Any suitable motive power such as motor 14 and suitable reduction gearing 15 may be utilized to rotate the cutter arm, drive a chain (not shown) carrying the cutters 13, and drive the endless conveyor 11 to deliver the stored material from the inner end 16 of the trough to outside the silo. The gearing and drive mechanism encompassed within the unloader apparatus has not been described in detail because it forms no part of the present invention and is merely briefly described purely for illustrative purposes.

As above stated, the invention comprises a method for establishing or forming arches in the bottom layer of silage stored within a storage structure. Experimentation has indicated that the formation and control of planned arches at the bottom of a column of silage disposed within a storage structure will facilitate the removal of the remaining material—in fact it provides a method whereby certain types of stored silage may be readily removed where difficulty has heretofore been encountered with such material. After the various steps of the method have been carried out, it has been found that the silage disposed above the arches tends to flow downwardly at substantially uniform rate during operation of the bottom unloading apparatus because the formation of a plurality of arches of progressively increasing base lengths removes the reason which has been found to cause the resistance to free downward passage of the silage, namely, a circumferential ring of silage, of substantial width disposed around the inner lower edge of the bottom cylindrical section of the structure.

Storage structures such as silos, are available in a variety of cubic capacities which embraces a variety of heights and diameters ranging in general from thirty to sixty feet in height and generally fourteen to twenty feet in diameter. The method of the invention is adaptable to any particular size of silo but for illustrative purposes only it will be described in connection with a so-called seventeen foot silo, that is, a silo which is seventeen feet in diameter across the bottom of the lowest cylindrical section.

The method of the invention may be also accomplished in a number of ways but for the puposes of this description, and merely for illustrative purposes only, one manner of carrying out the invention will be described.

In carrying out the method of the invention and for illustrative purposes, the unloading apparatus 8 is inserted into the trough 9 through the opening 7 in the wall of the silo. As explained the trough 9 extends from the opening 7 to substantially the center of the structure so that as the cutter arm 10 rotates it can cut and dislodge the stored material equi-distant around the interior of the structure. In normal practice when unloading stored material from a seventeen foot silo, a cutter arm slightly shorter than eight and one-half feet would be employed so that as it is rotated around the interior of the silo, the cutters carried on the arm will clear the inner surface of the lower cylindrical section by from one to perhaps two inches. Experimentation has shown, however, that with hard packed silage great difficulty was encountered, first in getting the cutter arm to rotate under such great load, second that the stored material failed to arch properly and thereby imposed a substantially greater load on the cutter arm. The method of the invention has solved these difficulties in the following manner.

Using a filled silo of seventeen feet diameter as an example, a cutter arm of substantially seven feet in length is first employed. After being located properly so that it may rotate about a center coinciding with the center of the structure, the cutter arm is rotated slowly for a very few revolutions, preferably not more than three. During these revolutions the cutter teeth cut and dislodge the silage immediately adjacent to their path of travel and this is accomplished fairly easily because the silage has a tendency not to become as packed, or be of such density near the center of the structure as it does near the wall of the structure. The inner edge of the base of the arched silo is shown at 17 in Fig. 3. As the silage is being dislodged and removed to the center opening 16, experimentation has indicated that the silage immediately above the shorter rotating cutter arm tends to bridge over or arch to form a concavity so that a considerable portion, if not substantially all of the weight of the silage has been removed from off the cutter arm and transferred to the circumferential ring of silage, which is initially of substantial width and disposed between the end of the cutter arm and the wall of the silo. This step provides the initial arching in the remaining silage and further rotation of the shorter cutter arm is of no avail because the remaining silage is held up by the circumferential ring of silage previously described.

The next step of the method of the invention is to remove the short cutter arm and then install a cutter arm of greater length. The second arm should be of a length comparable to the length of arm normally used with a seventeen foot silo and should be capable of cutting out and dislodging the silage in the above mentioned ring to a distance substantially close to the inner surface of the wall. The inner edge of the base of the final arched silage is shown by the dotted line 18 in Fig. 3. This distance may vary but it will be commensurate with a practice which will ensure that the ceramic enamel lining of the silo will not be injured by the teeth of the cutter arm. It will be appreciated that there will be no difficulty encountered by the longer cutter arm in cutting through the substantially compacted ring of silage which remains after the first step of the method, because of the reduced weight of the silage on the top of the arm due to the bridging which has been established by the method of the invention.

The density of the greater proportion of the silage which remains above the unloading apparatus, after operation of the plurality of cutter arms, will be substantially less than the density of silage at the bottom of the silo before practicing the steps of the invention, because prior to cutting out the silage in a plurality of operations to establish an arch at the bottom of the silage column, the weight of the column is such that the bottom of the column becomes substantially compact and dense.

Further and continued rotation of the longer arm will tend to maintain the bridging or aching over the unloader apparatus while simultaneously providing a substantially uniform rate of downward travel of the remaining silage which the second rotating cutter arm will have no difficulty in dislodging for delivery to the endless conveyor and thence to outside the silo.

It is to be understood that the above described method of the invention may be accomplished with various apparatus and the apparatus above described is intended to be merely illustrative. The invention is the positive formation of a plurality of arches at the bottom of a column of silage disposed in a storage structure such as a silo to the end that hard packed material may initially be removed from the bottom of the column of the material and continually feed downwardly at a substantially uniform rate of flow, upon operation of the longer cutter arm, so that the unloading apparatus will be able to handle the same without undue effort due to high starting and operating torque.

Various embodiments of the invention may be employed within the scope of the following claims:

I claim:

1. The method of removing stored material from the bottom of a storage structure which comprises dislodging and removing a central portion of the bottom layers of the material by an unloading apparatus disposed within said structure to establish an upwardly extending arch in the remaining material, and subsequently dislodging and removing a further outward portion of the bottom layers of the remaining material by said apparatus to thereby decrease the width of the base of said arch and permit the remaining material to feed downwardly at a rate substantially corresponding to the rate of removal of the material.

2. The method of removing stored material from the bottom of a storage structure which comprises establishing an upwardly extending arch in the bottom of said material by cutting and removing a central generally circular portion of the bottom layers of the material by an unloading apparatus disposed within the storage structure and beneath the stored material, and subsequently cutting and removing a further radially outward portion of the bottom layers of the remaining material to increase the span of the arched material and permit the material to feed downwardly at a rate substantially corresponding to the rate of removal of the material.

3. The method of removing stored material from the bottom of a storage structure having an unloading apparatus disposed in the bottom of the structure, which comprises forming an upwardly extending arch of predetermined span in the stored material, and subsequently increasing the span of said first formed arch, both said spans being formed by dislodging and removing a portion of said material by rotating an element of the unloading apparatus, said element being of varying lengths during the formation of said spans.

4. The method of removing stored material from a vertically disposed cylindrical storage structure having an unloading apparatus with a rotatable cutter arm disposed in the bottom of the structure beneath the stored material, which comprises removing a generally circular portion of the bottom layers of the stored material by rotating the cutter arm beneath the material to cut and remove a portion of the material to form an upstanding arch therein having a generally annular base, and subsequently cutting and removing additional stored material from the base of said arch by rotating a cutter arm of greater length than said first arm to increase the span of the arch whereby the remaining stored material is permitted to feed downwardly at a rate substantially corresponding to the rate of removal of the material.

5. The method of removing stored material from a vertically disposed cylindrical storage structure having an unloading apparatus with a rotatable cutter arm disposed in the bottom of the structure beneath the stored material, which comprises establishing an upstanding arch in said material having an annular base of predetermined width by rotating the cutter arm of the unloading apparatus through the material to dislodge and remove a portion of the material, and subsequently decreasing the width of the annular base of the arch by dislodging and removing additional material from the inner surface thereof by rotating a second cutter arm therethrough, said second arm being of greater length than said first arm to thereby permit the remaining stored material to feed downwardly at a rate substantially corresponding to the rate of removal of the material.

6. The method of removing stored material from the bottom of a storage structure which comprises removing a central portion of the bottom layers of the material by an unloading apparatus disposed within said structure to establish a concavity in the remaining material by dislodging and removing a portion of the material, and subsequently dislodging and removing radially outwardly a further portion of the bottom layers of the remaining material by said apparatus to thereby decrease the width of the base of said arch and permit the material to feed downwardly at a rate substantially corresponding to the rate of removal of the material.

7. The method of removing stored material from the bottom of a storage structure which comprises dislodging and removing circumferentially a central portion of the bottom layers of the material by a rotating cutter arm disposed within said structure beneath the material to establish an upwardly extending arch in the remaining material, and subsequently dislodging and removing radially outwardly a further portion of the remaining material by a rotating cutter arm to thereby decrease the width of the base of said arch and permit the material to feed downwardly at a rate substantially corresponding to the rate of removal of the material.

References Cited in the file of this patent

UNITED STATES PATENTS

| | | |
|---|---|---|
| 1,274,548 | Holnagel et al. | Aug. 6, 1918 |
| 2,595,333 | Clapp | May 6, 1952 |
| 2,601,049 | Neighbor | June 17, 1952 |